C. M. SMITH.
REFRIGERATOR WAGON BODY.
APPLICATION FILED NOV. 6, 1909.

973,082.

Patented Oct. 18, 1910.

Attest:
Ewd L. Tolson
Bent. M. Stahl

Inventor:
Curtis M. Smith
By F. L. Middleton
Atty

UNITED STATES PATENT OFFICE.

CURTIS M. SMITH, OF WASHINGTON, DISTRICT OF COLUMBIA, ASSIGNOR TO AMERICAN SECURITIES COMPANY, A CORPORATION OF WEST VIRGINIA.

REFRIGERATOR-WAGON BODY.

973,082.

Specification of Letters Patent.  Patented Oct. 18, 1910.

Application filed November 6, 1909. Serial No. 526,645.

*To all whom it may concern:*

Be it known that I, CURTIS M. SMITH, citizen of the United States, residing at Washington, District of Columbia, have invented certain new and useful Improvements in Refrigerator-Wagon Bodies, of which the following is a specification.

My invention is designed to provide a delivery wagon for sealed cans containing ice, ice cream, milk or other products requiring to be kept cool in transit.

Figure 1:
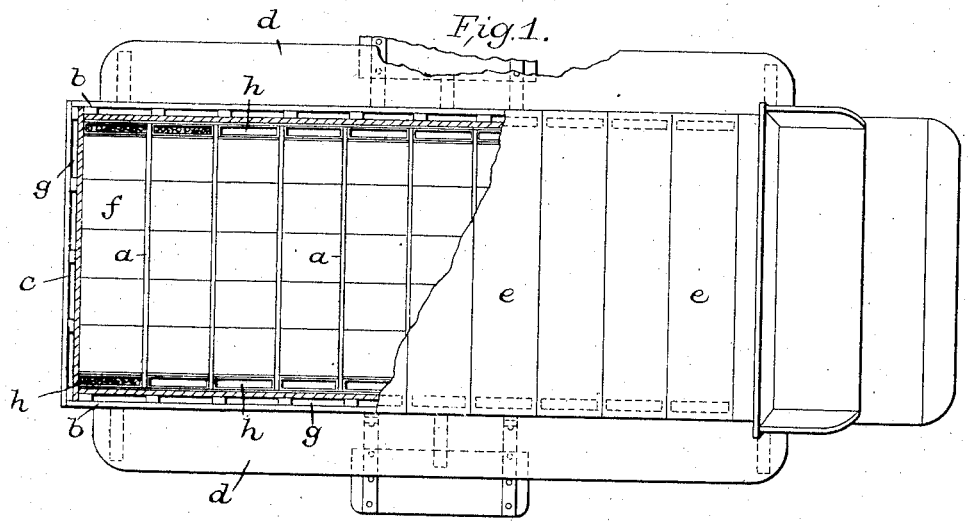
Figure 2:
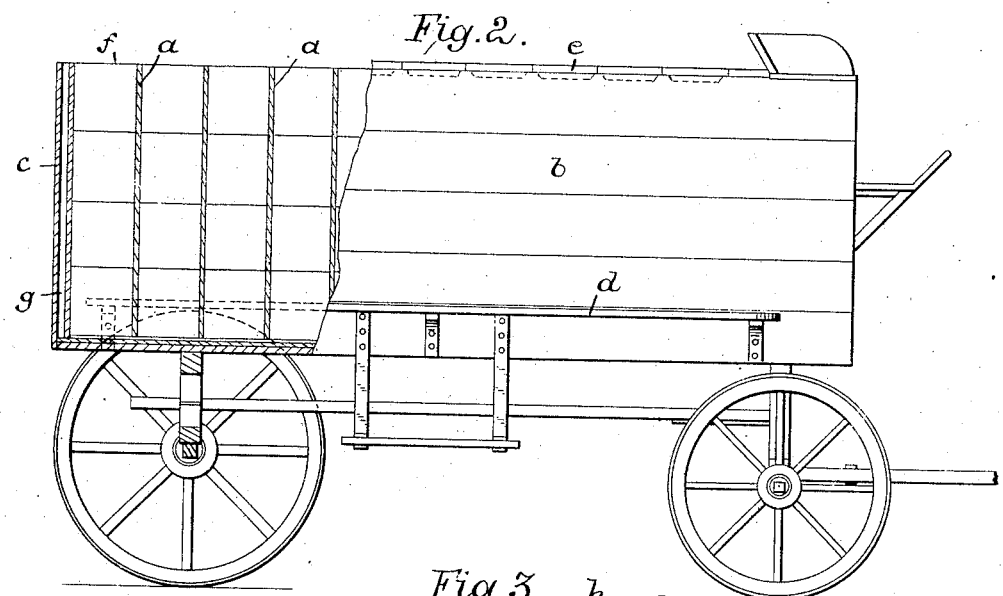
Figure 3:
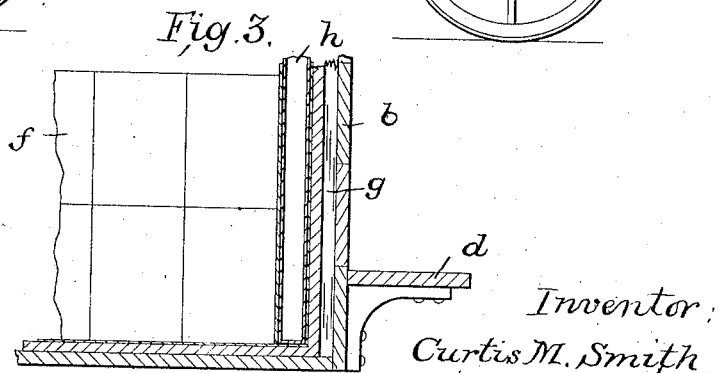

In the accompanying drawing:—Figure 1 is a plan view of a wagon embodying my improvements shown partly in section; Fig. 2 is an elevation with part of the side wall broken away; and Fig. 3 is a detail view in vertical section.

The wagon shown may be of any ordinary construction as to its size, shape and running gear. As shown, the wagon body is divided into a series of compartments by partitions $a$; the side walls are shown at $b$, and the end wall at $c$. A running board is shown at $d$. A cover for the wagon body is composed of a series of boards readily removable, as shown at $e$. Each removable board $e$ serves as a cover for a compartment $f$. The side and end walls, as well as the bottom of the wagon, are double, with air spaces between, as shown at $g$. At the side of each compartment I place a metallic can, as shown in Figs. 1 and 3, at $h$, the exact width of the compartment, and this is adapted to be filled with waste or crushed ice and salt, forming a cooling medium. In the space $f$ between the two ice containing cans, I place the receptacles containing the material to be transported, such as milk, ice cream and the like, though I intend to use the wagon for the special purpose of transporting ice in sealed cans, and I aim to make the wagon of such size as to hold in each of the compartments $f$ five of these cans from side to side, and four cans deep. These cans, of course, may, as I have stated, contain either ice for domestic use and adapted to be placed directly into the refrigerator, or the receptacles may contain any other product of a perishable nature which it is desired to transport in cold storage. The cans containing the refrigerating material are readily removable and replaceable for the purpose of emptying them when this is required, and new ice and salt added.

I claim as my invention:—

In a wagon body having a series of compartments adapted to receive portable cans containing perishable material and a series of receptacles adapted to contain refrigerating material located around the walls of the wagon and independently removable, substantially as described.

In testimony whereof, I affix my signature in presence of two witnesses.

CURTIS M. SMITH.

Witnesses:
H. M. BARRETT,
EDWARD N. SARTON.